United States Patent [19]

Noguchi et al.

[11] Patent Number: 4,695,209

[45] Date of Patent: Sep. 22, 1987

[54] HELICAL GUIDE APPARATUS USABLE FOR A GEAR SHAPER

[75] Inventors: Takayo Noguchi; Yoichi Togawa; Tsuneo Nishimoto; Yoshiharu Tonohara, all of Kyoto; Tadashi Rokkaku, Hiroshima; Seigo Nakai, Kyoto; Michio Araki, Kyoto; Kahei Kitano, Kyoto, all of Japan

[73] Assignee: Mitsubishi Jukogyo Kabushiki Kaisha, Japan

[21] Appl. No.: 888,973

[22] Filed: Jul. 21, 1986

[30] Foreign Application Priority Data

Aug. 13, 1985 [JP] Japan .................. 60-176926
Oct. 21, 1985 [JP] Japan .................. 60-233189
Feb. 5, 1986 [JP] Japan .................. 61-22151

[51] Int. Cl.$^4$ .............................................. B23F 9/04
[52] U.S. Cl. .............................. 409/42; 74/23; 409/58; 409/60
[58] Field of Search ............ 409/9, 10, 42, 46, 58–60, 409/43–45; 74/22 R, 23, 24

[56] References Cited

U.S. PATENT DOCUMENTS

| 2,465,707 | 3/1949 | Braun | 409/58 |
| 3,651,738 | 3/1972 | Bregi | 409/59 |
| 4,514,119 | 4/1985 | Izumo | 409/58 X |

FOREIGN PATENT DOCUMENTS 1041767 10/1958 Fed. Rep. of Germany .
3533122 3/1986 Fed. Rep. of Germany .

Primary Examiner—Gil Weidenfeld
Assistant Examiner—Steven C. Bishop
Attorney, Agent, or Firm—McGlew and Tuttle

[57] ABSTRACT

The helical guide apparatus includes a main spindle, a male pattern, a first female pattern and a second female pattern which are operatively associated with one another. As the main spindle adapted to reciprocably move in the axial direction and rotate in the circumferential direction is reciprocably driven in the axial direction by first reciprocable driving means, it carries out reciprocable rotational movement in accordance with a lead which is determined by a combination of the first helical projection on the male pattern and the first helical recess on the first female pattern. Then, the first female pattern is caused to carry out reciprocable movement in the axial direction of the main spindle in synchronization with reciprocable movement of the main spindle with the aid of second reciprocable driving means whereby it carries out reciprocable rotational movement in accordance with a lead which is determined by a combination of the second helical projection on the first female pattern and the second helical recess on the second female pattern. Reciprocable rotational movement of the first female pattern is combined with reciprocable rotational movement caused by reciprocable movement of the main spindle. Any required helical angle can be steplessly determined prior to gear cutting operation.

3 Claims, 18 Drawing Figures

HELICAL GUIDE APPARATUS USABLE FOR A GEAR SHAPER

BACKGROUND OF THE INVENTION (i) Field of the Invention

The present invention relates to a helical guide apparatus usable for a gear shaper and more particularly to a helical guide apparatus of the type which is so constructed that a helical angle to be determined for workpieces can be adjusted steplessly.

(ii) Prior Art Statement

A conventional helical guide apparatus usable for a gear shaper is typically illustrated in FIG. 11 which is a sectional side view of the apparatus. The latter includes a main spindle 2 with a cutter 1 fixedly attached thereto and the main spindle 2 is supported by means of a bearing 3 in such a manner as to reciprocably move in the axial direction and rotate in the circumferential direction. As a crank mechanism is driven, the main spindle 2 is reciprocably displaced in the axial direction via a connecting rod 4 and a spherical bearing 5. FIG. 12 is a perspective view of a male pattern 6 which is firmly fitted onto the upper tapered part of the main spindle 1. Further, the apparatus includes a female pattern 8 which is fitted into a flange 7 in order to guide movement of the male pattern 6. By virtue of the arrangement made in that way it is assured that the main spindle 2 is caused to carry out reciprocable rotational movement as it is reciprocably displaced in the axial direction. During gear cutting operation the flange 7 is rotated by means of a combination of a worm wheel 9 and a worm which is not shown in the drawing while it is maintained in the synchronized state relative to a helical gear which is subjected to gear cutting as a workpiece.

FIGS. 13 and 14 are a schematic view respectively which illustrate a relation between dimensions of the cutter and lead of the helical guide apparatus. As will be apparatus from the drawings, the relation between lead L of the helical guide apparatus and pitch circle diameter $d_{cp}$ will be represented by the following formulas.

$$L \tan \phi = \pi \cdot d_{cp} \quad (1)$$

$$d_{cp} = (m_n \cdot Z)/\cos \phi \quad (2)$$

where $\phi$ is a helix angle of the cutter 1, $m_n$ is a gear tooth module of the cutter 1 as measured at a right angle relative to gear tooth and Z is a number of gear teeth on the cutter 1.

As taught by the formulas, a helix angle which is employable for a single helical guide is restricted only to the case where operative conditions that $d_{cp}$ is dimensioned within a predetermined range and Z is an integral number are fulfilled. For that reason a cutter which can be practically used with the same lead for the purpose of gear cutting is restricted only to gears having specific dimensions and a helical angle on a helical gear to be worked cannot be changed as required.

Since the conventional helical guide apparatus is constructed in the above-described manner, it is impossible to change a helical angle prior to gear cutting operation for a helical gear unless the male pattern 6 and the female pattern 8 are replaced with other ones. Accordingly, the conventional helical guide apparatus has drawbacks in that designing is limited only within a certain range and it takes a very long time until preparative work prior to gear cutting and replacement of the existent patterns is completed.

SUMMARY OF THE INVENTION

The present invention has been made with the foregoing background in mind and its object resides in providing a steplessly adjustable helical guide apparatus usable for a gear shaper which assures that a helical angle can be steplessly adjusted irrespective of speed of displacement of a main spindle and a helical guide in the axial direction.

Other object of the present invention is to provide a helical guide apparatus usable for a gear shaper which assures that plural kinds of helical gears having different helical angle can be worked without any necessity for particular preparative work and replacement.

Another object of the present invention is to provide a helical guide apparatus usable for a gear shaper which assures minimized restriction concerning design of a helical gear, markable reduction of time required for preparative work and improved productive efficiency.

(First Invention)

To accomplish the above objects there is proposed according to one aspect of the invention a helical guide apparatus usable for a gear shaper of the type comprising a main spindle adapted to reciprocably move in the axial direction and rotate in the circumferential direction, first reciprocable driving means for reciprocably driving the main spindle, a male pattern fixedly connected to the main spindle or made integral with the same, the male pattern being formed with a first helical projection of which lead and direction are determined corresponding to a certain required helix angle, a first female pattern disposed around the male pattern and having a first helical recess on the inner wall surface into which the first helical projection on the male pattern is fitted and a second helical projection on the outer surface thereof of which lead and direction are determined same or opposite to those of the first helical projection, a second female pattern disposed around the first female pattern and having a second helical recess on the inner wall surface thereof into which the second helical projection on the first female pattern is fitted, the second female pattern being rotated in synchronization with a workpiece to be worked, and second reciprocable driving means for reciprocably driving the first female pattern in the axial direction of the main spindle in synchronization with reciprocable movement of the latter.

When the rotatable main spindle is reciprocably displaced in the axial direction with the aid of the first reciprocable driving means, it is caused to carry out reciprocable rotational movement in accordance with a lead which is determined by a combination of the first helical projection on the male pattern and the first helical recess on the first female pattern. If the existent helical angle is required to change, the first female pattern is reciprocably displaced in the axial direction of the main spindle in synchronization with reciprocable movement of the main spindle with the same phase as that of the first helical projection or the reverse phase relative to the latter with the aid of the second reciprocable driving means. Thus, the first female pattern carries out reciprocable rotational movement in accordance with a lead which is determined by a combination of the second helical projection on the first female pattern and the second helical recess on the second female pattern and reciprocable rotational movement of the first female pattern is then combined with reciprocable rotational movement of the main spindle as mentioned above.

(Second Invention)

Further, there is proposed according to another aspect of the invention a helical guide apparatus usable for a gear shaper of the type comprising a main spindle adapted to reciprocably move in the axial direction and rotate in the circumferential direction, reciprocable driving means for reciprocably driving the main spindle, a male pattern fixedly connected to the main spindle or made integral with the same, the male pattern being formed with a first helical projection of which lead and direction are determined corresponding to a certain required helix angle, a first female pattern disposed around the male pattern and having a first helical recess on the inner wall surface into which the first helical projection on the male pattern is fitted and a second helical projection on the outer surface thereof of which lead and direction are determined corresponding to the certain required helix angle, a second female pattern disposed around the first female pattern and having a second helical recess on the inner wall surface thereof into which the second helical projection on the first female pattern is fitted, the second female pattern being rotated in synchronization with a workpiece to be worked, and a link mechanism for operatively connecting the main spindle to the first female pattern in such a manner as to change its fulcrum position, the link mechanism being adapted to control a ratio of speed of movement of the main spindle relative to that of the first female pattern in the axial direction in operative association with the main spindle by changing the fulcrum position.

As the rotatable main spindle is reciprocably displaced in the axial direction with the aid of the reciprocable driving means, it carries out reciprocable rotational movement in accordance with a lead which is determined by a combination of the first helical projection on the male pattern and the first helical recess on the first female pattern. At the same time the first female pattern is reciprocably displaced in the axial direction with the aid of a link mechanism whereby it carries out reciprocable rotational movement in accordance with a lead which is determined by a combination of the second helical projection on the first female pattern and the second helical recess on the second female pattern. Rotational movement of the main spindle is achieved by combining rotational movement caused by a combination of the male pattern and the first female pattern with rotational movement caused by a combination of the first female pattern and the second female pattern. If the existent helical angle is required to change, an amount of combined rotational movement as mentioned above is adjusted as required by changing the fulcrum position of the link mechanism and changing the speed of displacement of the main spindle relative to the first female pattern in the axial direction.

(Third Invention)

Further, there is proposed according to another aspect of the invention a helical guide apparatus usable for a gear shaper of the type comprising a main spindle adapted to recirpocably move in the axial direction and rotate in the circumferential direction, a male pattern fixedly connected to the main spindle or made integral with the same, the male pattern being formed with a first helical projection of which lead and direction are determined corresponding to a certain required helic angle, a first female pattern disposed around the male pattern and having a first helical recess on the inner wall surface into which the first helical projection on the male pattern is fitted and a second helical projection on the outer surface thereof on which lead and direction are determined same or opposite to those of the first helical projection, a second female pattern disposed around the first female patter and having a second helical recess on the inner wall surface thereof into which the second helical projection on the first female pattern is fitted, the second female pattern being rotated in synchronization with a workpiece to be worked, a first crank mechanism for reciprocably moving the male pattern together with the main spindle in the axial direction by rotation of a first crank shaft and a second crank mechanism for reciprocably moving the first female pattern in synchronization with reciprocable movement of the male pattern with a phase angle of zero degree or 180 degrees relative to the male pattern by rotation of a second crank shaft adapted to rotate in synchronization with the first crank shaft.

As the main spindle is reciprocably displaced in the axial direction by rotating the first crank shaft in the first crank mechanism, it carries out reciprocable rotational movement in accordance with a lead which is determined by a combination of the first helical projection on the male pattern and the first helical recess on the first female pattern. At this moment, when the first female pattern carries out relative movement in the axial direction in synchronization with movement of the main spindle by rotating the second crank shaft in the second crank mechanism, the main spindle is rotated in the form of combined rotational movement which is produced by a combination of reciprocable rotational movement in accordance with a lead of the first helical projection and reciprocable rotational movement in accordance with a lead of the second helical projection. As both the first and second crank shafts are rotated in the synchronized relation, the main spindle is rotated in dependence on a speed of relative displacement of the male pattern and the first female pattern which is operatively related to a speed of displacement of the main spindle. When the existent helical angle is required to change, an extent of relative displacement of the male pattern and the first female pattern is changed by adjusting radiuses of the first and second crank shafts as required.

Since the helical guide mechanism of the invention is constructed in the above-described manner, it has the following advantageous features.

When the apparatus is employed for a gear shaper, a helical angle can be steplessly adjusted as required irrespective of speed of displacement of the main spindle and the helical guide in the axial direction.

Accordingly, a helical angle of workpiece to be subjected to gear cutting can be determined as required. As a result, it is possible to work plural kinds of helical gears having different helical angles without any necessity for particular preparative work and replacement. Further, restriction concerning design of a helical gear can be minimized and time required for some preparative work can be shortened remarkably, resulting in improved productive efficiency being assured.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

DETAILED DESCRIPTION OF PREFERRED EMBODIMENTS

Now, the present invention will be described in a greater detail hereunder with reference to the accompanying drawings which illustrate first to third embodiments thereof.

(First Embodiment)

Figure 1:
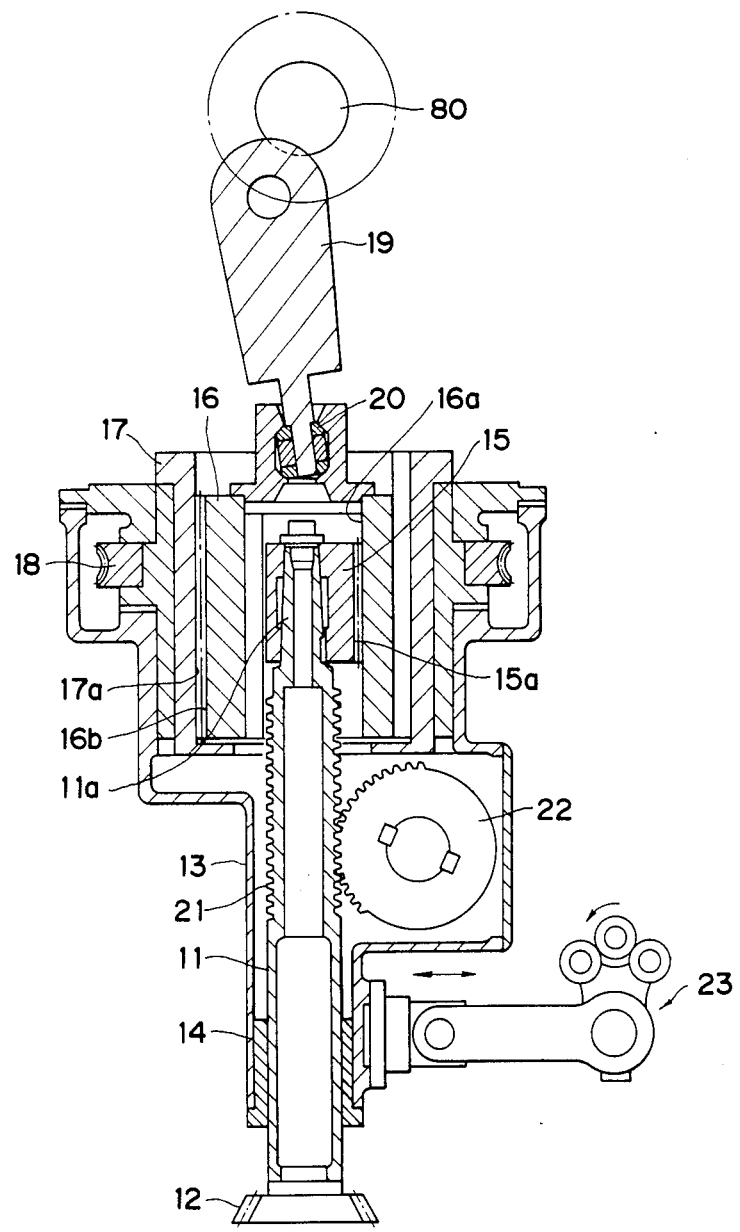
FIG. 1 is a sectional side view of a steplessly adjustable helical guide apparatus usable for a gear shaper in accordance with the first embodiment of the invention.

FIG. 1 illustrates by way of sectional side view a steplessly adjustable helical guide apparatus usable for a gear shaper in accordance with the first embodiment of the present invention.

As shown in the drawing, the apparatus includes a main spindle 11 of which lower end part has a cutter 12 fixedly secured thereto. The main sprindle 11 is guided by means of a bearing 14 fitted into a cutter head 13 in such a manner it slidably moves in the axial direction and rotates in the peripheral direction. A male pattern 15 with a first helical projection 15a formed thereon which has lead and direction corresponding to an optionally determined helix angle is firmly fitted onto the upper tapered shank 11a of the main spindle 11. As is apparent from the drawing, a first female pattern 16 is disposed around the periphery of the male pattern 15 in such a manner that the first helical projection 15a on the male pattern 15 is fitted into a first helical recess 16a on the inner wall of the first female pattern 16. The first female pattern 16 is formed with a second helical projection 16b on the outer surface thereof of which lead and direction are identical to or different from those of the first helical projection 15a. Further, a second female pattern 17 is disposed around the first female pattern 16 in such a manner that the second helical projection 16b on the first female pattern 16 is fitted into a second helical recess 17a on the inner wall of the second female pattern 17. During gear shaping operation the second female pattern 17 is caused to rotate with the aid of a combination of a worm wheel 18 and a worm (not shown) in the synchronized relation relative to a helical gear to be worked as a workpiece. The first female pattern 16 is operatively connected to a connecting rod 19 which serves as second reciprocable driving means adapted to be driven by means of a crank mechanism 81 (see FIG. 15) which includes a crankshaft 80. Thus, as the crank mechanism 81 is actuated, the first female pattern 16 is reciprocably displaced in the axial direction via the connecting rod 19 and the spherical bearing 20. Incidentally, the crank mechanism 81 will be described in more details later. The main spindle 11 is formed with a plurality of rack teeth 21 over the outer surface thereof which mesh with a driving gear 22 serving as first reciprocable driving means. Thus, as the driving gear 22 is driven, the main spindle 11 is reciprocably displaced in the axial direction. In the illustrated embodiment driving mechanisms to be described later are employed for the purpose of driving the connecting rod 19 and the driving gear 22. However, the present invention should not be limited only to them. Alternatively, other type of driving mechanism including gear train, numerical control line or the like adapted to be opeated in the synchronized relation may be employed. Incidentally, in the drawing reference numeral 23 designates a back-off mechanism which serves to displace the main spindle away from the working area when no workpiece is worked there.

Next, operations of the apparatus as constructed in the above-mentioned manner will be described below.

While the main spindle 11 is displaced up and down together with the cutter 12 by actuation of the driving gear 22, twisting movement is carried out in accordance with the lead of the first helical projection 15a on the male pattern 15. As the main spindle 11 is displaced up and down in that way, the first female pattern 16 is also displaced up and down by means of the connecting rod 19 in the synchronized relation relative to displacement of the main spindle 11. Since the male pattern 15 is fitted into the first female pattern 16 and the latter is fitted into the second female pattern 17, it results that rotational movement (twisting movement) of the main spindle 11 and the cutter 12 about the center axis of the former is achieved in the form of addition of twisting movement caused by the lead of the first helical projection 15a on the male pattern 15 to twisting movement caused by the lead of the second helical projection 16b on the first female pattern 16 or subtraction of the former from the latter. Since a distance of stroke of the male pattern 15 is determined in dependence on a workpiece to be worked, a helical angle which is determined in the case of displacement of the male pattern 15 only can be properly corrected by adjusting the distance of stroke of the first female pattern 16 as required. If a distance of stroke of the first female pattern 16 is adjusted so as to cancel rotational movement caused by the male pattern 15, twisting movement of the main spindle becomes zero as seen from the workpiece side. This means that a gear having a helical angle of zero can be produced. Further, a distance of stroke of the first female pattern 16 is set to zero, a gear having a helical angle which is determined by the lead of the male pattern 15 only is produced.

As to mode of operation of the male pattern 15 and the first female pattern 16 the following cases will be noted.

(1) the case where the direction of twisting of the first helical projection 15a is identical to that of the second helical projection 16b and they are operated in the synchronized relation while a phase angle of 180 degrees is maintained.

(2) the case where the direction of twisting of the first helical projection 15a is reverse to that of the second helical projection 16b and they are operated in the synchronized relation while a phase angle of zero is maintained.

(3) the case where the direction of twisting of the first helical projection 15a is identical to that of the second helical projection 16a and they are operated in the synchronized relation while a phase angle of zero is maintained.

(4) the case where the direction of twisting of the first helical projection 15a is reverse to that of the second helical projection 16b and they are operated in the synchronized relation while a phase angle of 180 degrees is maintained.

In the cases (1) and (2) any helical angle ranging from zero to a certain angle at which twisting is effected in the leftward or rightward direction can be obtained by adjusting a distance of stroke of each of the male pattern 15 and the first female pattern 16 as required. In the cases (3) and (4) a range of determination of helical angle can be enlarged while the direction of twisting is kept constant.

Accordingly, any required helical angle can be obtained by selectively determining a size of lead of the second helical projection 16b on the first female pattern 16, a direction of lead and a distance of stroke of the first female pattern 16 as required.

Figure 15:
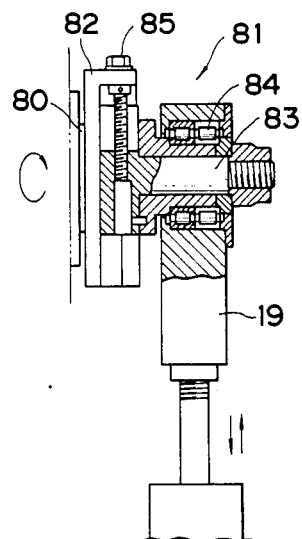
FIGS. 15 and 16 are fragmental sectional views of a hitherto known crank mechanism employable for the apparatus in accordance with the first embodiment of the invention respectively.

Next, description will be made as to a crank mechanism 81 operatively connected to a crankshaft 80 to drive the connecting rod 19 which serves as second reciprocable driving means with reference to FIG. 15 (It should be noted that this mechanism is disclosed by Japanese Publication Patent NO. 23932/1984). The crankshaft 80 has a flange 82 fixedly secured to the end thereof and an eccentric shaft 83 is supported on the flange 82 to slide thereon in the radial direction relative to the crankshaft 80. The upper end of the connecting rod 19 is pivotally connected to the eccentric shaft 83 with the aid of a bearing 84. The lower end of the connecting rod 19 is pivotally connected to the first female pattern 16 via a spherical bearing 20. When the crankshaft 80 is rotated while the eccentric shaft 83 is displaced from the center axis of the crankshaft 80 by a predetermined distance to assume an eccentric position, the first female pattern 16 is caused to reciprocably move by a predetermined distance in the axial direction of the main spindle 11 via the connecting rod 19.

The mechanism has an adjustment screw 85 and the position of the eccentric shaft 83 as seen in the radial direction of the crankshaft 80 can be changed as required by rotating the adjustment screw 85. Namely, an amount of eccentricity can be changed as required. Thus, a distance of stroke can be adjusted as required by changing an amount of eccentricity.

Figure 16:
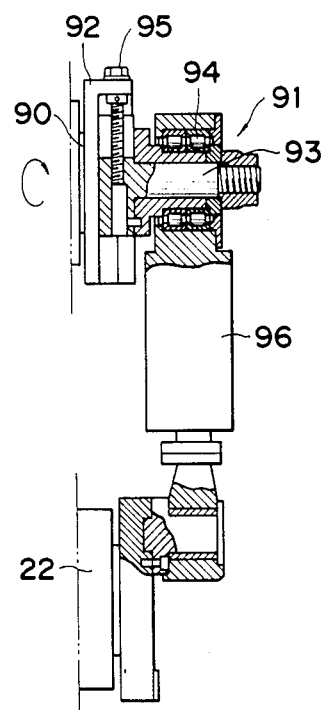
Figure 17:
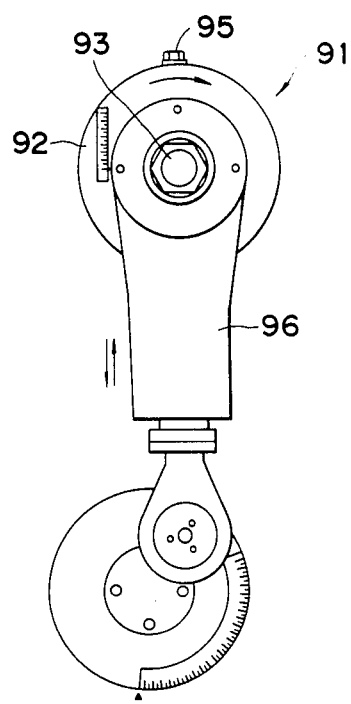
FIG. 17 is a front view of the crank mechanism in FIG. 16.

Next, description will be made below as to a driving mechanism 91 for rotating the driving gear 22 in the synchronized relation relative to operation of the connecting rod 19 with reference to FIG. 16 which is a fragmental sectional view of the driving mechanism 91. FIG. 17 is a front view of the driving mechanism 91 (It should be noted that this mechanism is disclosed by Japanese Publication Patent NO. 23932/1984). As shown in FIG. 16, a crankshaft 90 adapted to be rotated in the synchronized relation relative to the crankshaft 80 includes a flange 92 and an eccentric shaft 93 at the right end thereof in the same manner as the flange 82 and the eccentric shaft 83 in the crank mechanism 81. The upper end of a connecting rod 96 is pivotally connected to the eccentric shaft 93 with the aid of a bearing 94. The lower end of the connecting rod 96 is also pivotally connected to the driving gear 22. Thus, the connecting rod 96 can move reciprocably in the vertical direction. As the crankshaft 90 is rotated while the eccentric shaft 93 is located at the position eccentric relative to the axis of the crankshaft 90 by a predetermined amount of eccentricity, the connecting rod 96 is caused to reciprocably move in both the direction as identified by arrow marks in the drawing whereby the driving gear 22 is reciprocably rotated by a predetermined angular distance. This leads to a result that both the main spindle 11 and the first female pattern 16 operatively connected to the connecting rod 19 are displaced up and down in the synchronized relation.

The driving mechanism 91 includes an adjustment screw 95 in order to assure that an amount of eccentricity of the eccentric shaft 93 relative to the axis of the crankshaft 90 can be adjusted as required by rotating the adjustment screw 95. A distance of stroke of both the main spindle 11 and the male pattern 15 can be adjusted as required by changing an amount of eccentricity.

(Second Embodiment)

Figure 2:
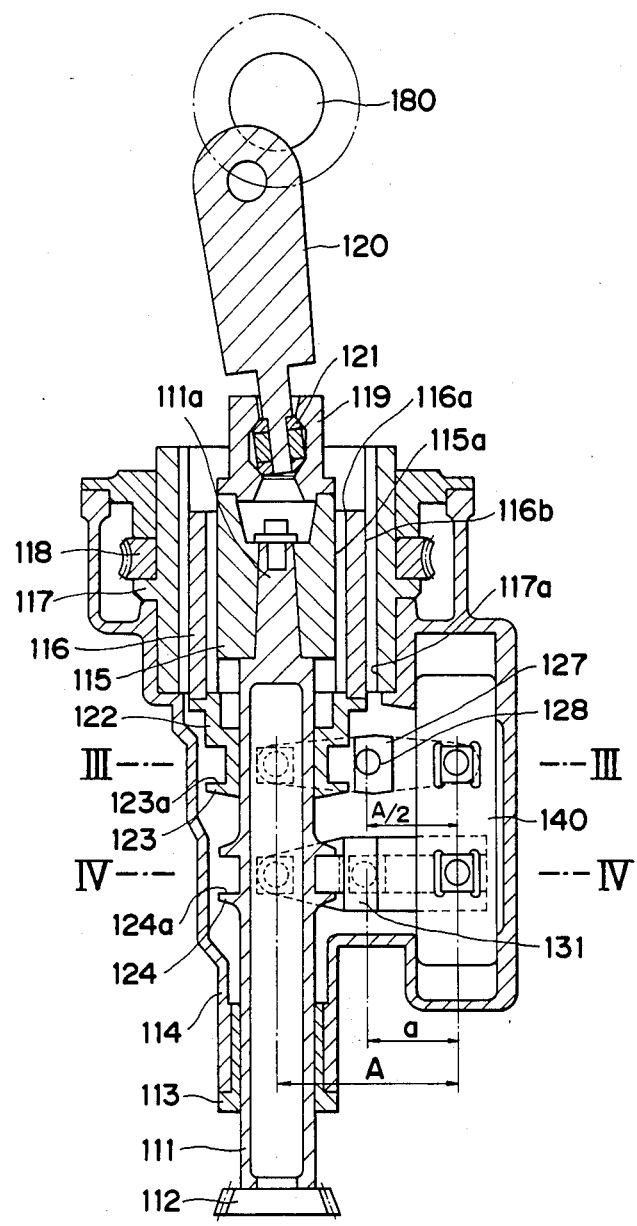
FIG. 2 is a sectional side view of a helical guide apparatus in accordance with the second embodiment of the invention.
Figure 3:
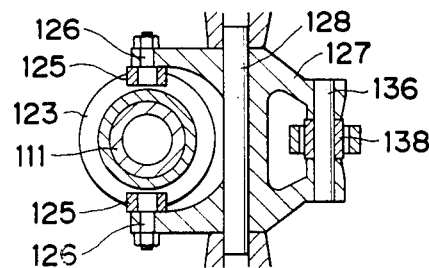
FIG. 3 is a cross-sectional view of the apparatus taken in line III—III in FIG. 2.
Figure 4:
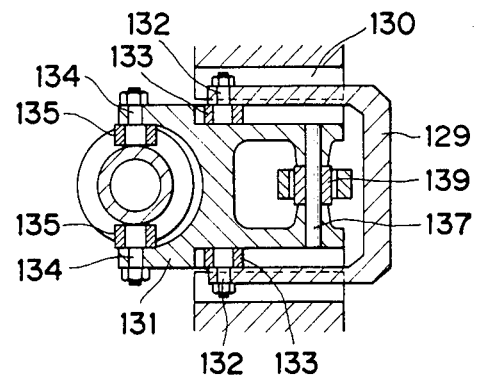
FIG. 4 is a cross-sectional view of the apparatus taken in line IV—IV in FIG. 2.

Next, description will be made below as to a helical guide apparatus usable for a gear shaper in accordance with the second embodiment of the present invention with reference to FIGS. 2 to 4, wherein FIG. 2 is a sectional side view of the apparatus, FIG. 3 is a cross-sectional view of the apparatus taken in line III—III in FIG. 2 and FIG. 4 is another cross-sectional view of the apparatus taken in line IV—IV in FIG. 2.

The apparatus includes a rotational main spindle 111 and a cutter 112 is fixedly secured to the lower end of the main spindle 111. The latter is supported in a cutter head 114 with the aid of a bearing 113 in such a manner as to slide in the axial direction and rotate in the circumferential direction. A male pattern 115 having a first helical projection 115a formed thereon which has lead and direction corresponding to a certain required helix angle is firmly fitted onto the upper tapered shank 111a of the main spindle 111. A first female pattern 116 is disposed around the male pattern 115 in such a manner that the first helical projection 115a on the male pattern 115 is fitted into a first helical recess 116a on the inner wall of the first female pattern 116. A second helical projection 116b is formed on the outer surface of the first female pattern 116. It should be noted that the second helical projection 116b has the same lead as that of the first helical projection 115a on the male pattern 115 but has the reverse direction to that of the same. A second female pattern 117 is disposed around the first female pattern 116 in such a manner that the second helical projection 116b on the first female pattern 116 is fitted into a second helical recess 117a on the inner wall of the second female pattern 117. During gear cutting operation the second female pattern 117 is rotated in the synchronized relation relative to a helical gear to be worked as workpiece with the aid of a combination of a worm wheel 118 and a worm which is not shown in the drawings. A housing 119 is fixedly mounted on the top of the male pattern 115 and the main spindle 111 is operatively connected via the male pattern 115 and the housing 119 to a connecting rod 120 serving as reciprocable driving means adapted to be driven by means of a crank mechanism 181 (see FIG. 18) which is operatively connected to a crank shaft 180. Thus, as the crank mechanism 181 is driven, the main spindle 111 is caused to reciprocably move in the axial direction with the aid of the connecting rod 120 and the spherical bearing 121. The crank mechanism 181 will be described in more details later.

The main spindle 111 is fixedly connected to the first female pattern 116 via a flange 122. An annular groove 123a is formed on a flange 123 which is made integral with the flange 122, while another annular groove 124a is formed on a flange 124 which is made integral with the main spindle 111. As shown in FIG. 3, a pair of sliders 125 are slidably fitted into the annular groove 123a and each of the sliders 125 is rotatably supported by means of a link 127 with the use of a pin 126. The link 127 in turn is supported turnable about a support pin 128 which is immovably held on the cutter head 114. As shown in FIG. 4, a frame 129 is disposed in such a manner as to move along a guide 130 in the direction at a right angle relative to the main spindle 111. A pair of support pins 132 serving as a fulcrum for a link 131 are fixedly held at both the ends of the frame 129 and a slider 133 slidably fitted into the link 131 is attached to each of the support pins 132. A pair of sliders 135 slidably fitted into the annular groove 124a are supported on both the ends of the link 131 with the aid of pins 134. Both the links 127 and 131 carry sliders 138 and 139 via pins 136 and 137. The cutter head 114 is provided with a link 140 which is slidable in parallel with the main spindle 111 and the sliders 138 and 139 are fitted into rectangular holes formed at both the end parts of the link 140. When the support pins 132 are displaced in compliance with sliding movement of the frame 129, any displacement of the link 131 is inhibited with the use of restrictive means which is not shown in the drawings irrespective of how the frame 129 is displaced.

Next, operation of the helical guide apparatus as constructed in the above-mentioned manner will be described below. The main spindle 111 with the cutter 112 attached thereto is displaced up and down together with the male pattern 115 as the connecting rod 120 is driven. The grooved flange 124 on the main spindle 111 displaces the links 131, 140 and 127 and moreover it displaces up and down the first female pattern 116 via the grooved flange 123 and the flange 122 in the operatively associated state relative to the main spindle 111.

During displacement of the grooved flange 124 effected in that way both twisting movement of the main spindle 111 caused by the lead of the first helical projection 115a on the male pattern 115 and twisting movement of the same caused by the lead of the second helical projection 116b on the first female pattern 116 are transformed to rotational movement of the main spindle 111 via the links 131, 140 and 127 corresponding to a distance of stroke of relative movement achieved by a combination of the male pattern 115 and the first female pattern 116 whereby the main spindle 111 carries out helix rotation in addition to displacement in the axial direction. As the position of the support pins 132 serving as a fulcrum for the link 131 is dislocated by means of the frame 129, a distance of stroke of relative movement achieved by the combination of the male pattern 115 and the first female pattern 116 varies. Thus, a helix rotation angle of the main spindle 111 can be determined as required.

Figure 5:
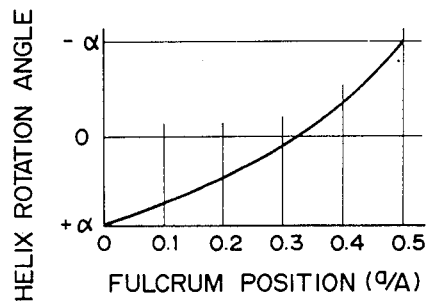
FIG. 5 is a graph illustrating a relation between helix rotation angle of the main spindle and fulcrum position of the link.

When it is assumed that a distance between the axis of the main spindle 111 and the pin 137 is identified by A, a distance between the support pins 132 and the pin 137 is identified by a, a fulcrum position of the link 131 is represented by a/A and a helix rotation angle of the main spindle 111 is identified by $\alpha$, a relation as shown in FIG. 5 is established between fulcrum position a/A of the link 131 and helix rotation angle $\alpha$ of the main spindle 111. Incidentally, in FIG. 5 +$\alpha$ represents that the main spindle 111 is rotated in the rightward direction and —$\alpha$ represents that it is rotated in the leftward direction as seen from the connecting rod side. As will be readily apparent from the drawing, dislocation of the fulcrum position of the link 131 toward the main spindle 111 causes the main spindle 111 to be rotated in the leftward direction, while dislocation of the fulcrum position of the same toward the pin 137 causes the main spindle 111 to be rotated in the rightward direction. Thus, any helix rotation angle of the main spindle 111 can be determined as required.

For instance, in the case where the first female pattern 116 is kept in the stationary state, the main spindle 111 carries out rotation corresponding to the lead of the first helical projection 115a on the male pattern 115. Further, in the case where the first female pattern 116 is displaced in the axial direction at the same speed as that of the main spindle 111, the latter carries out rotation corresponding to the lead of the second helical projection 116b on the first female pattern 116. Moreover, in the case where the first female pattern 116 is displaced in the axial direction at a speed equal to a half of speed of the male pattern 115, rotational movement of the first female pattern 116 is offset by rotational movement of the male pattern 115 whereby the main spindle 111 carries out movement only in the axial direction.

Figure 18:
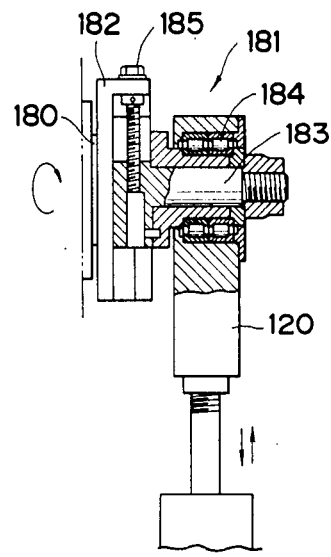
FIG. 18 is a fragmental sectional view of a hitherto known crank mechanism employable for the apparatus in accordance with the second embodiment of the invention.
Figure 14:
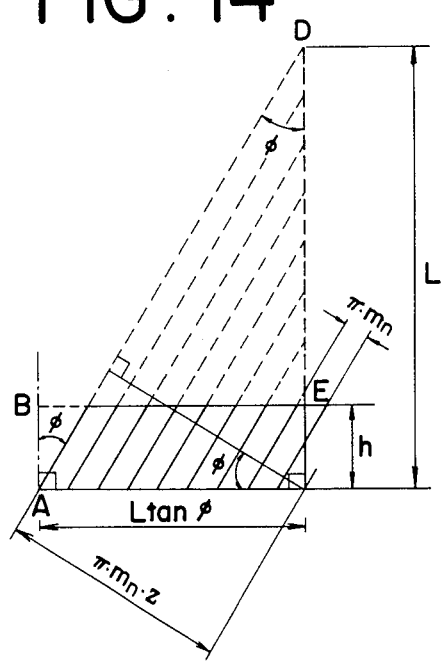
FIG. 14 is views as seen in the direction identified by an arrow mark P in FIG. 13.

Next, description will be made below as to the crank mechanism 181 operatively connected to a crankshaft 180 to actuate the connecting rod 120 serving as reciprocable driving means with reference to FIG. 18 (It should be noted that this mechanism is already disclosed by Japanese Publication Patent NO. 23932/1984.). A flange 182 is fixedly secured to the right end of the crankshaft 180 and an eccentric shaft 183 is supported on the flange 182 in such a manner as to slidably move in the radial direction relative to the crankshaft 180. The upper end of the connecting rod 120 is pivotally connected to the eccentric shaft 183 with the aid of a bearing 184. On the other hand, the lower end of the connecting rod 120 is also pivotally connected to the male pattern 115 via a spherical bearing 121. When the crankshaft 180 is rotated while the eccentric shaft 183 is located at the position eccentric relative to the axis of the crankshaft 180 with a predetermined amount of eccentricity, the male pattern 115 is caused to reciprocably move in the axial direction of the main spindle 111 by a predetermined distance by means of the connecting rod 120.

The mechanism includes an adjustment screw 185 and the position of the eccentric shaft 183 as seen in the radial direction relative to the crankshaft 180 can be changed as required by rotating the adjustment screw 185. Namely, an amount of eccentricity can be adjusted in this way. Thus, a distance of stroke can be adjusted as required by changing an amount of eccentricity.

In this embodiment description has been made above as to the case where the first helical projection 115a has the same lead as that of the second helical projection 116b but has the opposite direction of helix to that of the latter. However, the present invention should not be limited only to this. An extent of lead and a direction of helix can be changed as required.

As will be readily apparent from the above description, the helical guide apparatus usable for a gear shaper is so constructed that a helical angle of the main spindle 111 is adjusted as required with the use of the links 127, 131 and 140. Thus, the apparatus has advantageous features that any existent means can be employed as driving means for displacing the main spindle 111 in the axial direction and any change of position of displacement stroke of the main spindle 111 in the axial direction can be compensated by operatively associating the position of the whole links 127, 131 and 140 therewith. Further, proper helix rotation can be achieved even when displacement speed of the main spindle 111 in the axial direction varies non-linearly. Since displacement of the fulcrum of each of the links 127, 131 and 140 is carried out by displacing the frame 129, a mechanism required for displacement of the fulcrum can be designed simply and moreover automatic displacement of the fulcrum can be achieved easily. Further, since relative displacement parts in the link mechansim are adapted to come in surface contact, high rigidity of the mechanism is assured.

(Third Embodiment)

Figure 6:
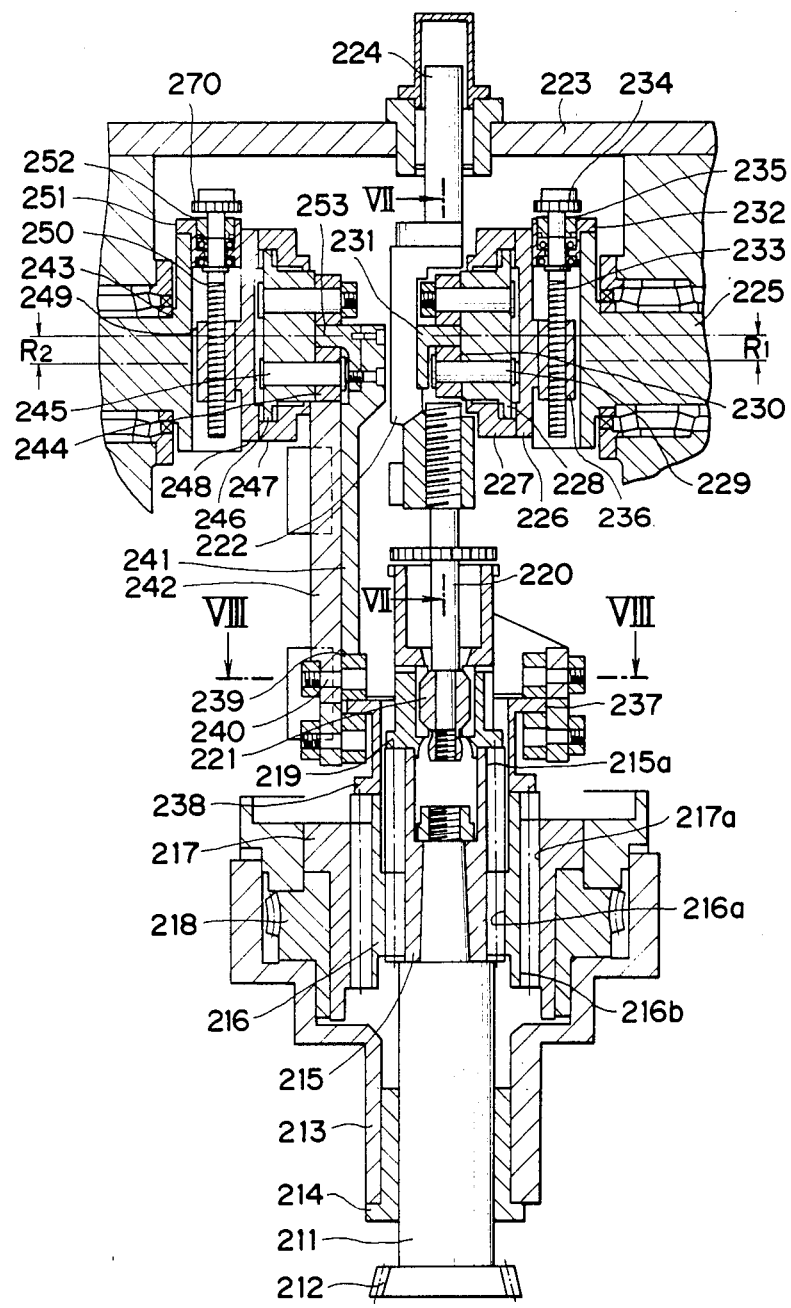
FIG. 6 is a sectional side view of a steplessly adjustable helical guide apparatus usable for a gear shaper in accordance with the third embodiment of the invention.
Figure 7:
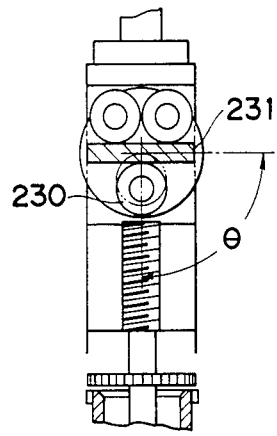
FIG. 7 is a fragmental sectional view of the apparatus taken in line VII—VII in FIG. 6.
Figure 8:
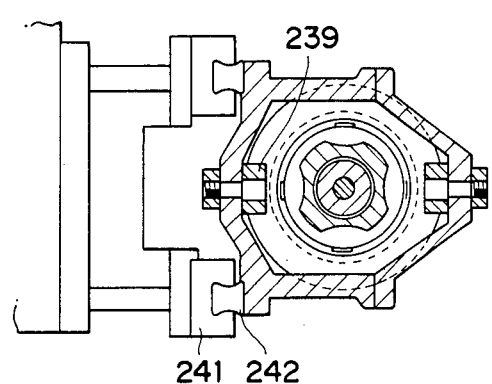
FIG. 8 is a cross-sectional view of the apparatus taken in line VIII—VIII in FIG. 6.
Figure 10:
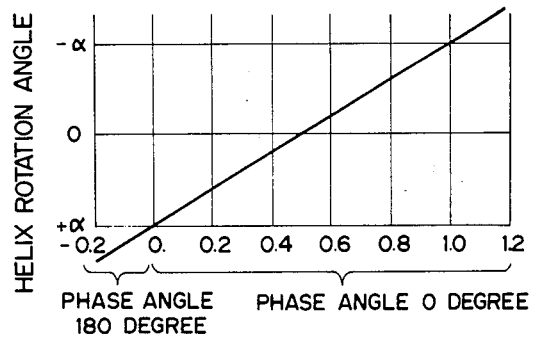
FIG. 10 is a graph illustrating a relation between ratio of crank radius and helix rotation angle in the apparatus in FIG. 6.
Figure 12:
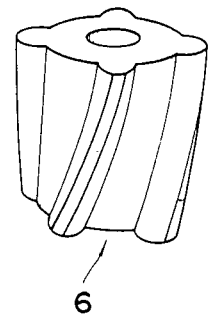
FIG. 12 is a perspective view of a male pattern employable for the helical guide apparatus.
Figure 9:
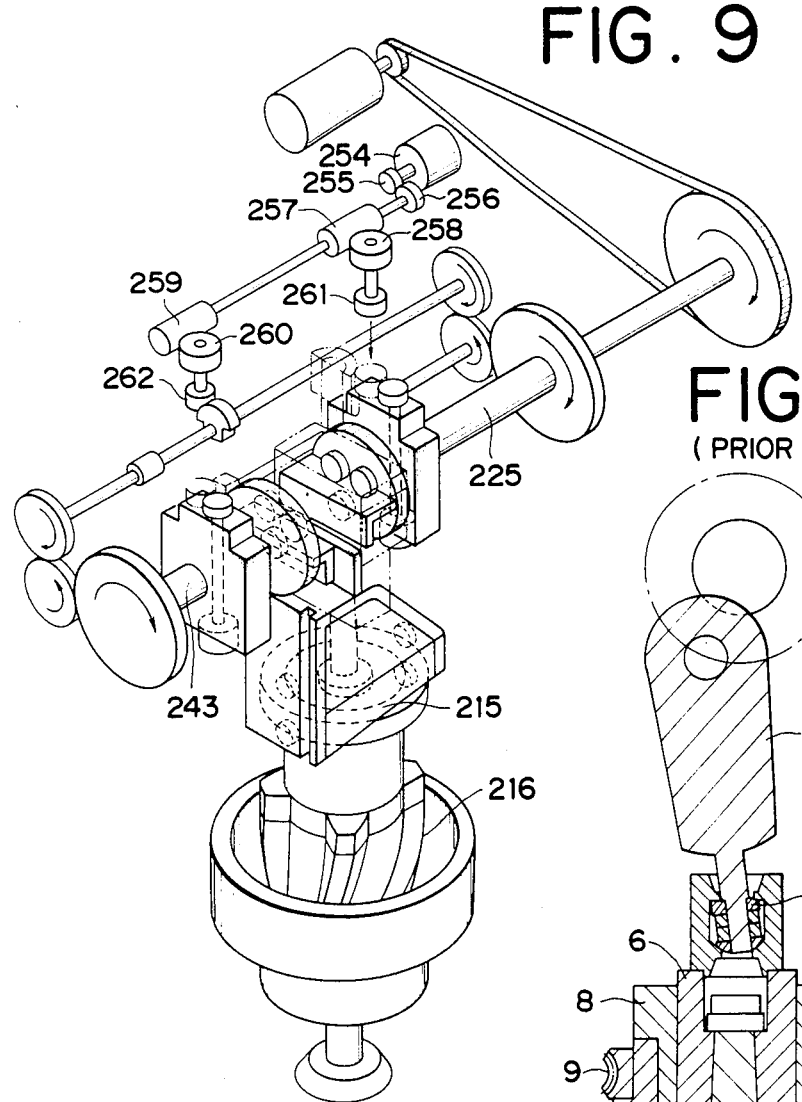
FIG. 9 is a perspective view of a driving mechanism for the apparatus shown in FIG. 6.
Figure 11:
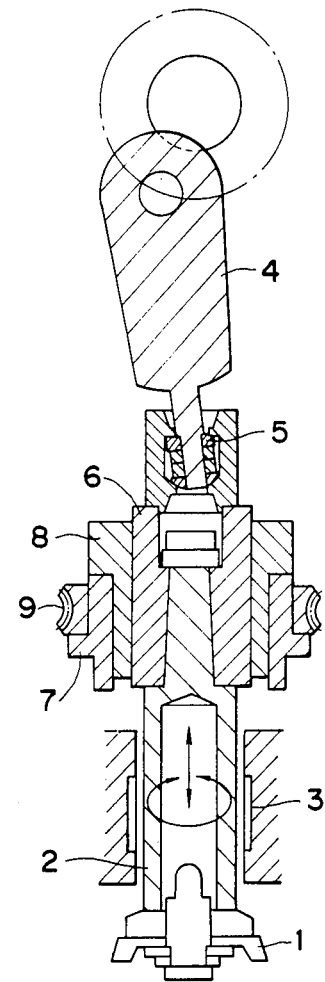
FIG. 11 is a sectional side view of a typical conventional helical guide apparatus.
Figure 13:
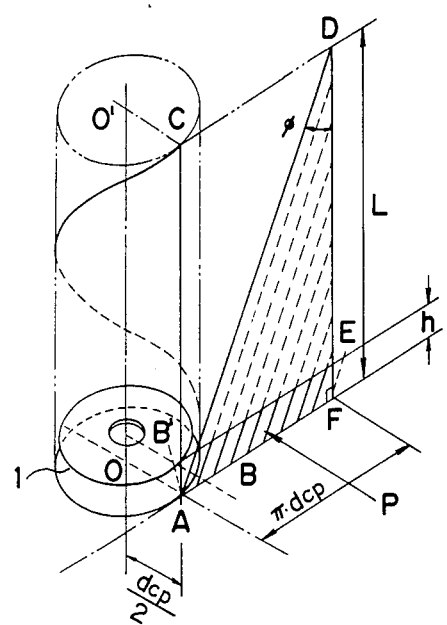
FIG. 13 is a schematic perspective view illustrating a relation between dimensions of a cutter and lead of a helical guide.

Next, description will be made below as to a steplessly adjustable helical guide apparatus usable for a gear shaper in accordance with the third embodiment of the present invention with reference to FIGS. 6 to 10, wherein FIG. 6 is a sectional view of the apparatus, FIG. 7 is a sectional view of the apparatus taken in line VII—VII in FIG. 6, FIG. 8 is a cross-sectional view of the apparatus taken in line VIII—VIII in FIG. 6, FIG. 9 is a schematic perspective view of a driving mechanism for the apparatus and FIG. 10 is a graph representative of a relation between ratio of crank radius and helix rotation angle relative to the apparatus.

The apparatus includes a main spindle 211 and a cutter 212 is fixedly attached to the lower end of the main spindle 211. The main spindle 211 is supported in a cutter head 213 in such a manner as to slidably move in the axial direction and rotate in the circumferential direction with the aid of a bearing 214 which is fitted into the cutter head 213. A male pattern 215 having a first helical projection 215a formed thereon which has lead and direction corresponding to a certain required twist angle is firmly fitted onto the upper tapered part of the main spindle 211. A first female pattern 216 is disposed around the male pattern 215 in such a manner that the first helical projection 215a on the male pattern 215 is fitted into a first helical recess 216a on the inner wall of the first female pattern 216. A second helical projection 216b is formed on the outer surface of the first female pattern 216. A second female pattern 217 is disposed around the first female pattern 216 in such a manner that the second helical projection 216b on the first female pattern 216 is fitted into a second helical recess 217a on the inner wall of the second female pattern 217. During gear cutting operation the second female pattern 217 is rotated in the synchronized relation relative to a helical gear to be worked as workpiece with the aid of a worm wheel 218 and a worm which is not shown in the drawings.

A housing 219 is fitted onto the upper end of the male pattern 215 and a spherical bearing 221 attached to the lower end of a feed screw 220 is rotatably and turnably accommodated in the housing 219. The upper end part of the feed screw 220 is threadably engaged to female threads in a block 222 and a rod 224 rotatably supported in a gear box 223 is attached to the block 222. During gear cutting operation a thread engagement section comprising the feed screw 220 and female threads is kept fixed whereby an integral structure comprising the feed screw 220, block 222 and rod 224 is operatively supported by means of the spherical bearing 221 and gear box 223 at both the ends thereof.

A first crank shaft 225 for the male pattern 215 is rotatably supported in the gear box 223 and a bracket 226 is secured to the end face of the first crank shaft 225 so as to slidably move in the axial direction. The bracket 226 has a flange 227 secured thereto and a circular disc 228 is rotatably supported in the space as defined between the bracket 226 and the flange 227. The circular disc 228 carries three roller followers 230 with the aid of pins 229 and the block 222 is provided with a yoke 231 which extends at a right angle relative to the axis of the main spindle 211 in such a manner that the three roller followers 230 are fitted onto the yoke 231. The first crank shaft 225 has a flange 232 fixedly secured to the left end thereof and a feed screw 233 is rotatably supported on the flange 232. A gear 234 is attached to the top end of the feed screw 233 and the latter is held immovable in the axial direction by means of a nut 235. The bracket 226 has a female threaded member 236 which is threadably engaged to the feed screw 233.

A cylinder 238 having an annular plate 237 integrally formed thereon is fixedly mounted on the first female pattern 216 and a plurality of roller followers 239 are fitted onto the annular plate 237 of the cylinder 238 in such a manner as to clamp the annular plate 237 therebetween. Each of the roller followers 239 is supported by means of a slider 241 via a pin 240 and the slider 241 is slidably supported with the aid of a linear guide 242. A second crank shaft 243 usable for the first female pattern 216 is located in horizontal alignment with the first crank shaft 225 and rotatably supported in the gear box 223 in the symmetrical relation relative to the same. Specifically, the second crank shaft 243 includes three roller followers 244, pins 245, a circular plate 246, a flange 247, a bracket 248, a female threaded member 249, a feed screw 250, a flange 251, a nut 252 and a gear 270 in the same manner as in the case of the first crank shaft 225. The three roller followers 244 are fitted onto the yoke 253 which extends in the direction at a right angle relative to the direction of sliding movement of the slider 241.

As shown in FIG. 9, both the first and second crank shafts 225 and 243 are operatively connected to one another with a phase angle of zero degree or 180 degrees by way of a gear train as shown in the drawing. Rotational movement of the first crank shaft 225 is converted into reciprocable movement in the axial direction of the male pattern 215 and the main spindle 211 via the yoke 231, block 222, feed screw 220, spherical bearing 221 and housing 219 with the aid of a Scotch yoke mechanism which constitutes the first crank mechanism comprising the first crank shaft 225, bracket 226, flange 227, roller followeres 230 and yoke 231. At this moment rotational movement of the second crank shaft 243 is also converted into reciprocable movement of the first female pattern 216 in the axial direction of the latter via the yoke 253, slider 241 and three roller followers 244 with the aid of a Scotch yoke mechanism which is constructed in the same manner as the foregoing one. Accordingly, the main spindle 211 carries out so-called helix movement which comprises its reciprocable movement in the axial direction, rotational movement of the male pattern 215 relative to the first female pattern 216 corresponding to a distance of stroke of relative displacement achieved by the male pattern 215 relative to the first female pattern 216 and rotational movement of the first female pattern 216 relative to the second female pattern 217 in the combined state.

Incidentally, determination of a distance of stroke of the main spindle 211 is achieved by way of the steps of rotating the feed screw 233 by driving the gear 234, sliding the bracket 226 via the female threaded member 236 and thereby changing crank radius R1 of the male pattern 215. On the other hand, adjustment of a distance of stroke of the first female pattern 216 is properly achieved in dependence on thus determined crank radius R1 by way of the steps of driving the gear 270, sliding the bracket 248 and thereby changing crank radius R2 of the first female pattern 216.

FIG. 10 illustrates how helix rotation angle $\alpha$ of the main spindle 211 varies in dependence on relative movement achieved by the male pattern 215 relative to the first female pattern 216. The case where a plus mark is placed before $\alpha$ represents that rotation in the rightward direction as seen from the above is performed and the case where a minus mark is placed before $\alpha$ represents that rotation in the leftward direction as seen from the above is performed. In the illustrated embodiment the first helical projection 215a on the male pattern 215 has right lead and the second helical projection 216b on the first female pattern 216 has left lead, wherein both right and left leads are determined to be identical to one aother in size. Thus, in the case where the first female pattern 216 is kept in the stationary state, the main spindle 211 carries out right helix movement along the first helical projection 215a on the male pattern 215. In the case where the first female pattern 216 is displaced at the same speed as that of the male pattern 215 with a phase angle of zero degrees, it carries out left helix movement along the second helical projection 216b on the first female pattern 216. Further, in the case where the first female pattern 216 is displaced at a speed equal to a half of that of the male pattern 215 with a phase angle of zero degrees, rotational movement of the first female pattern 216 is offset by rotational movement of the male pattern 215 and thereby the main spindle 211 carries out movement only in the axial direction. Moreover, in the case where the first female pattern 216 is displaced in the axial direction with a phase angle of 180 degrees relative to the male pattern 215, the main spindle 211 carries out right helix movement with lead smaller than that of the first helical projection 215a on the male pattern 215.

Since the first female pattern 216 can change speed ratio in the range of 0 to 1.2 with a phase angle of zero degree relative to the male pattern 215 and in the range of 0 to 2.0 with a phase angle of 180 degrees relative to the same by properly adjusting crank radiuses, any required lead can be selected (in respect to size and direction).

In the illustrated embodiment a phase angle of the male pattern 215 relative to the first female pattern 216 is adjusted as required in 0 or 180 degrees without the use of a gear train while the direction of crank radiuses R1 and R2 is determined same or opposite to one another. However, the present invention should not be limited only to this. Alternatively, any numerical control system may be employed in place of the above-mentioned. Further, ratio of speed of displacement of the male pattern 215 to that of the first female pattern 216 may be changed by changing an angle $\theta$ of the yokes 231 and 253 relative to the axis of the main spindle 211.

As shown in FIG. 9, the gear 234 is driven by means of a servomotor 254 via gears 255 and 256, gears 257 and 258 and gear 261. Similarly, the gear 270 is driven by means of the servomotor 254 via gears 255 and 256, gears 259 and 260 and gear 262. Gears 261 and 234 and gears 262 and 270 are brought in meshing engagement to one another only when a distance of stroke of both the male pattern 215 and the first female pattern 216 is adjusted. Otherwise, gears 261 and 262 are displaced in the axial direction away from gears 234 and 270 by actuating hydraulic cylinders which are not shown in the drawing until they are disengaged from them. A mechanism for dislocating the position of the main spindle 211 in the vertical direction is adjusted by driving gears but its description will not be required.

As will be readily apparent from the above description, any required helical angle can be obtained by properly determining an amount of relative displacement of the male pattern 215 relative to the first female pattern 216 as well as speed of their displacement.

While a few typical preferred embodiments of the present invention has been fully described hereinbefore, it should of course be understood that the present invention is not intended to be restricted only to the details of the specific structures as shown in the preferred embodiments, but to the contrary, many changes or modifications may be made in the foregoing teachings without any restriction thereto and without depature from the spirit and scope of the present invention as defined by the appended claims.

We claim:

1. A helical guide apparatus usable for a gear shaper of the type comprising a main spindle adapted to reciprocably move in an axial direction and rotate in a circumferential direction, first reciprocable driving means for reciprocably driving said main spindle, a male pattern fixedly connected to the main spindle or made integral with the latter, said male pattern being formed with a first helical projection of which lead and direction are determined corresponding to a certain required helix angle, a first female pattern disposed around the male pattern and having a first helical recess on an inner wall surface into which said first helical projection on the male pattern is fitted and a second helical projection on an outer surface thereof of which lead and direction are determined same or opposite to those of the first helical projection, a second female pattern disposed around said first female pattern and having a second helical recess on an inner wall surface thereof into which said second helical projection on said first female pattern is fitted, said second female pattern being rotated in synchronization with a workpiece to be worked, and second reciprocable driving means for reciprocably driving the first female pattern in the axial direction of the main spindle in synchronization with reciprocable movement of the latter.

2. A helical guide apparatus usable for a gear shaper of the type comprising a main spindle adapted to reciprocably move in an axial direction and rotate in a circumferential direction, reciprocable driving means for reciprocably driving said main spindle, a male pattern fixedly connected to the main spindle or made integral with the latter, said male pattern being formed with a first helical projection of which lead and direction are determined corresponding to a certain required helix angle, a first female pattern disposed around the male pattern and having a first helical recess on an inner wall surface into which said first helical projection on the male pattern is fitted and a second helical projection on an outer surface thereof of which lead and direction are determined corresponding to said certain required helix angle, a second female pattern disposed around said first female pattern and having a second helical recess on an inner wall surface thereof into which said second helical projection on said first female pattern is fitted, said second female pattern being rotated in synchronization with a workpiece to be worked, and a link mechanism for operatively connecting the main spindle to the first female pattern in such a manner as to change a fulcrum position, said link mechanism being adapted to control a ratio of speed of movement of the main spindle relative to that of the first female pattern in the axial direction in operative association with the main spindle by changing said fulcrum position.

3. A helical guide apparatus usable for a gear shaper of the type comprising a main spindle adapted to reciprocably move in an axial direction and rotate in a circumferential direction, a male pattern fixedly connected to said main spindle or made integral with the latter, said male pattern being formed with a first helical projection of which lead and direction are determined corresponding to a certain required helix angle, a first female pattern disposed around the male pattern and having a first helical recess on an inner wall surface into which said first helical projection on the male pattern is fitted and a second helical projection on an outer surface there of which lead and direction are determined same or opposite to those of the first helical projection, a second female pattern disposed around said first female pattern and having a second helical recess on an inner wall surface thereof into which said second helical projection on said first female pattern is fitted, said second female pattern being rotated in synchronization with a workpiece to be worked, a first crank mechanism for reciprocably moving the male pattern together with the main spindle in the axial direction by rotation of a first crank shaft and a second crank mechanism for reciprocably moving the first female pattern in synchronization with reciprocable movement of the male pattern with a phase angle of zero degrees or 180 degrees relative to the male pattern by rotation of a second crank shaft adapted to rotate in synchronization with said first crank shaft.

* * * * *